United States Patent [19]

Vanderwerf

[11] 4,380,374
[45] Apr. 19, 1983

[54] VARIABLE FOCAL LENGTH PROJECTION LENS FOR USE ON OVERHEAD PROJECTORS

[75] Inventor: Dennis F. Vanderwerf, Cottage Grove, Minn.

[73] Assignee: Minnesota Mining & Manufacturing Company, St. Paul, Minn.

[21] Appl. No.: 254,947

[22] Filed: Apr. 16, 1981

[51] Int. Cl.³ .................. G02B 9/58; G02B 15/14
[52] U.S. Cl. .............................. 350/423; 350/445
[58] Field of Search ..................... 350/422, 423, 445

[56] References Cited

U.S. PATENT DOCUMENTS 3,357,775 12/1967 Appledorn et al. ............... 350/423
3,408,135 10/1968 Appledorn et al. ............... 350/445
4,311,366 1/1982 Clark et al. ........................ 350/445
4,350,415 9/1982 Conrad ............................... 350/445

Primary Examiner—John K. Corbin
Assistant Examiner—Rebecca D. Gass
Attorney, Agent, or Firm—Cruzan Alexander; Donald M. Sell; John C. Barnes

[57] ABSTRACT

A variable focal length overhead projector lens having four elements positioned in a projection head with two elements on either side of a folding mirror and having a single movable negative lens element closest to the screen being movable to vary the focal length and magnification at a fixed object-to-image distance to fill the screen.

4 Claims, 2 Drawing Figures

VARIABLE FOCAL LENGTH PROJECTION LENS FOR USE ON OVERHEAD PROJECTORS

DESCRIPTION

Technical Field

This invention relates to an overhead projection lens to vary the focal length and magnification of the lens to adjust the image size to the screen without a change in the object-to-image distance.

Background Art

Overhead Projection lenses have taken many forms, and the most conventional form in use today is a two-element projection lens utilizing two positive spaced meniscus lenses, one to direct light toward a reflector and the other to receive light from the reflector to project an image from a stage to the screen. The image is focused by movement of the head toward and away from the stage upon which the transparency is placed. Other projection systems have utilized two or more lenses spaced on the same side of the reflector, or one or each side of a reflector but, movement of the lenses relative to one another, or together usually provided only a means for focussing the image on the distant screen, see for example, U.S. Pat. No. 3,408,135, issued Oct. 29, 1968, assigned to the assignee of this application. In these systems, variations in the stage-to-screen distance afford changes in magnification.

One specific piece of prior art however discloses a projection lens with variable magnification. The prior art lens is disclosed in U.S. Pat. No. 3,357,775, issued Dec. 12, 1967, and assigned to the assignee of this application. This patent discloses a five-element projection lens with the elements positioned on different sides of a right angle prism element including two movable lens elements to vary the effective focal length of the lens, adjust the focus, and vary the magnification at predetermined object-to-image distances. The lens constructions as disclosed are placed at a fixed distance from the stage for supporting the transparency and the focus at desired image distances was obtained by axially moving a lens element in the head with respect to other elements. Variations in the focal length enabled magnification to be changed at a predetermined object-to-image distance.

A lens constructed according to the present invention is movable vertically with respect to the stage to permit a focussing of the image on the remote screen, and the rear lens element, the element closest to the screen, is movable to effectively change the equivalent focal length and the magnification factor of the lens to match the size of the projected image with the screen without a change in the position of the projector.

DISCLOSURE OF THE INVENTION

The present invention is directed to a variable magnification projection lens comprising four elements which, by the relative movement of one element, will afford a change in the effective focal length. The lens system has good image quality over its entire focal length range. Hence, the image magnification can be varied for a fixed object-to-image distance (OID). The entire projection lens can be moved relative to the object to afford focussing of the projected image. The lens comprises a first negative meniscus lens airspaced from a positive meniscus lens which is airspaced and generally on the other side of an inexpensive folding mirror from a second positive lens which in turn is airspaced from a movable negative lens. Two embodiments of a lens corresponding to the present invention are described herein affording a change in the magnification of the lens by a factor of 1.4× to 1.5× at a given object-to-image distance. The change in the effective focal length and the resultant magnification by the movement of a single lens element permits the image of the transparency to fill a given screen size without moving the projector. The lens is designed for use on projectors with head focusing and lamp-position adjustment. The use of only four lens elements with inexpensive glass makes this system economical for overhead projector application.

The lens system of the present invention permits the focal length to be variable throughout the range of movement of the lens affording a continuous change in the magnification by about a factor of 1.4 to 1.5, without changing the object-to-image distance, i.e. stage-to-screen distance.

The lens system of the present invention allows a given screen size to be filled at various projector-to-screen distances.

The lens system of the present invention is designed such that movement of the element closest to the screen adjusts the focal length and resultant magnification. Movement of the entire lens system with respect to the stage focusses the image on the screen similar to a fixed focal length system. Movement of the lamp to move the position of the image of the lamp in the projection head, maintains an effective stop position about half way between the four lenses of the lens assembly. This lamp movement during focusing assures a good contrast image and no vignetting of light in the system.

The folding mirror positioned between the positive lenses of the lens assembly may pivot about the optic axis to afford a movement of the projected image and in so moving the mirror, the front lens group pivots at twice the angular rate of pivotal movement of the folding mirror. Such a pivoting movement can change the projection angle up to 30 degrees from the horizontal and still maintain good image quality.

BRIEF DESCRIPTION OF THE DRAWING

The present invention will be further described in connection with the accompanying drawing wherein.

BEST MODE FOR CARRYING OUT THE INVENTION

Figure 1:
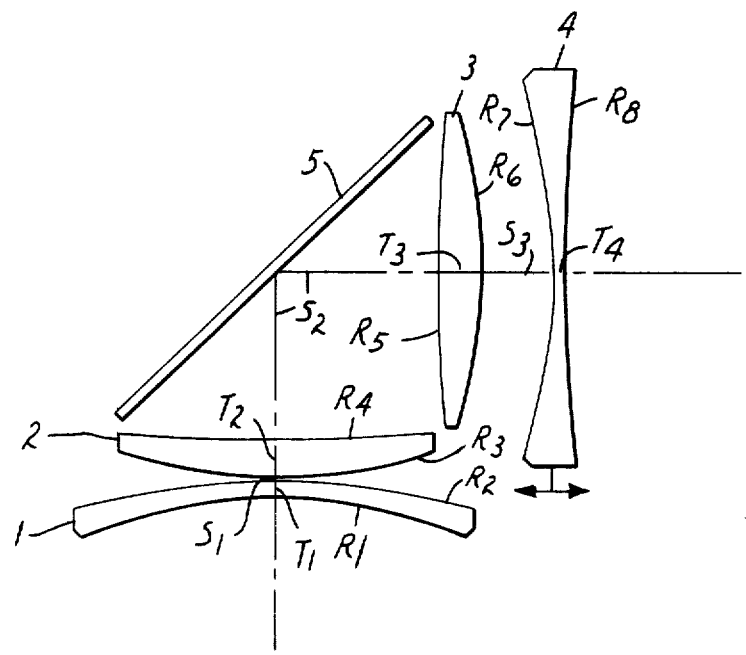
FIG. 1 is a diagrammatic view of a lens assembly constructed in accordance with the present invention.

Referring now to FIG. 1 there is illustrated a compact variable focus lens assembly for use in an overhead projector which permits a folding of the projected light from the vertical path to the horizontal path to direct the same toward a remote screen. The stage and screen are not illustrated, and the lens assembly of the present invention is preferably mounted for movement along the optic axis toward and away from the stage, and the mirror and lens elements forming the rear group are movable to afford a tilt capability of the image to move the same up and down on the screen in the manner well known in the art as an "articulating" arrangement wherein the front lens grouping pivots at twice the angular rate of pivotal movement of the mirror.

The lens illustrated in FIG. 1 comprises a first negative meniscus lens 1 which is airspaced $S_1$ from a positive meniscus lens 2 which is convex concave, a reflector or folding mirror 5 and a second positive lens 3 which is a biconvex or double convex lens which is spaced, $S_3$ from a movable negative lens 4 which is a double concave lens.

In a first specific example of the lens assembly of FIG. 1, the respective lens elements are recited together with the corresponding refractive indices N for the D line of the spectrum, the corresponding dispersive indices V, are given for each lens and the radii of curvature R of each surface of each lens element is given. The respective surfaces are numbered in sequence and indicated by the subscript in the same order as the lens elements are numbered and are consecutively numbered from the stage toward the screen with plus and minus values of R indicating surfaces which are respectively convex and concave to radiation entering the front lens element of the system (the element closest to the stage). The axial thickness T of the respective lens elements and the air spaces between the lens elements are also recited with the respective lens elements thickness being identified for each lens by the corresponding subscript and the air spaces S between the lens elements being also identified by subscripts numbered in sequence in the same order as the lens elements. The quantities of the radii, thickness and spacing are expressed in millimeters. The lens system shown in the table below has a variable focal length between 277.3 mm and 365.4 mm and the length along the optic axis varies between 124.0 mm and 163.0 mm.

TABLE 1

| Lens | $N_d$ | V | Radii mm | T mm | S mm |
|---|---|---|---|---|---|
| 1 | 1.6200 | 36.37 | $R_1 = -177.0$ | $T_1 = 3.0$ | |
| | | | $R_2 = -319.49$ | | $S_1 = 1.0$ |
| 2 | 1.5168 | 64.17 | $R_3 = +135.23$ | $T_2 = 13.0$ | |
| | | | $R_4 = +2133.60$ | | $S_2 = 91.0$ |
| 3 | 1.5225 | 59.48 | $R_5 = +1200.0$ | $T_3 = 12.0$ | |
| | | | $R_6 = -127.0$ | | $S_3 = 1.0$–$40.0$ |
| 4 | 1.5168 | 64.17 | $R_7 = -184.20$ | $T_4 = 3.0$ | |
| | | | $R_8 = +616.60$ | | |

The lens 1 has an equivalent focal length of $-645.31$ mm, lens 2 has an equivalent focal length of 278.76 mm, element 3 has an equivalent focal length of 220.48 mm, and element 4 has an equivalent focal length of $-274.09$. The nominal diameters for the lenses are as follows: Lens 1, 105.0 mm; lenses 2 and 3, 90 mm; and lens 4 having a diameter of 110.0 mm.

The lenses are designed and sized to project a full A4 size stage (285×285 mm).

The lens of Table 1 provides variable magnifications at various distances from the screen, and the table below, Table 2, provides a representative sample of the magnifications at various focal lengths for fixed stage-to-screen distances.

TABLE 2

| Focal | Stage-To-Screen Distance (m) | | |
|---|---|---|---|
| Length (mm) | 2.158 | 2.44 | 2.8 |
| 356.4 ($S_3 = 1$) | 3.79X | 4.61X | 5.67X |
| 312.9 ($S_3 = 20$) | 4.65X | 5.56X | 6.75X |
| 277.3 ($S_3 = 40$) | 5.52X | 6.54X | 7.87X |

Thus, referring to Table 2, it will be noted that with a projection stage to screen distance of 2.44 meters (8.0 feet) the image of a 254 mm×254 mm transparency on the stage could fill a screen with an image of between 1.17 by 1.17 meters to an image of 1.66 by 1.66 meters.

Figure 2:
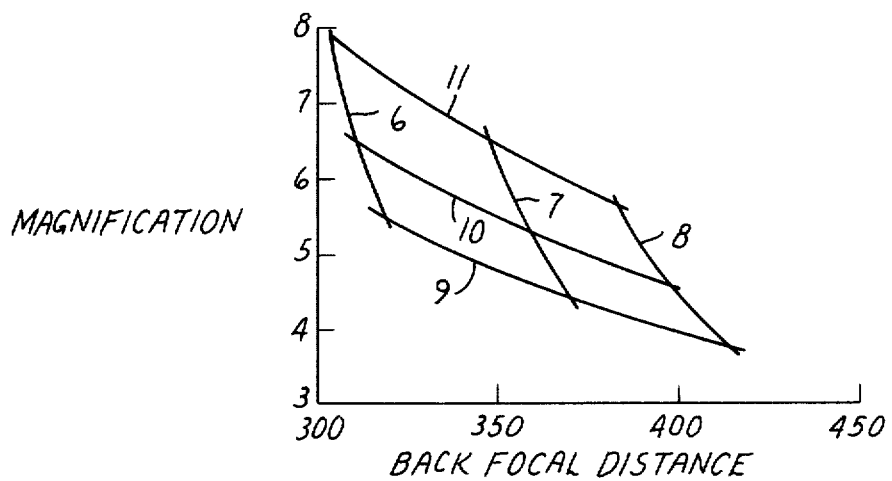
FIG. 2 is a graph relating the focal length, magnification, back focus, object-to-image distance, and the useful operating range of the lens assembly.

Referring now to FIG. 2, there is illustrated a graph showing a set of curves which graphically illustrate the extent of change of the focal length, magnification, back focal distance and stage-to-screen distances for the lens of FIG. 1 and Table 1. The chart plots the magnification between 3× and 8× on the vertical axis with the back focal distance plotted on the horizontal axis between 300 and 450 mm. Line 6 illustrates a fixed focal length of 277.3 mm wherein $S_3$ equals 40 mm, line 7 corresponds to the fixed focal length of 323.3 mm, wherein $S_3$ equals 15 mm; and line 8 indicates the fixed focal length of 356.4 mm, wherein $S_3$ equals 1 mm. The horizontally extending curved lines correspond to fixed stage-to-screen distances wherein line 9 equals a stage-to-screen distance (OID) of 2.158 meters, line 10 equal a stage-to-screen distance (OID) of 2.428 meters, and line 11 illustrates a fixed stage-to-screen distance (OID) of 2.8 meters.

A second embodiment of a lens assembly corresponding to the present invention is indicated in Table 3:

TABLE 3

| Lens | $N_d$ | V | Radii mm | T mm | S mm |
|---|---|---|---|---|---|
| 1 | 1.6200 | 36.37 | $R_1 = -155.45$ | $T_1 = 4.0$ | |
| | | | $R_2 = -265.77$ | | $S_1 = 1.0$ |
| 2 | 1.5168 | 64.17 | $R_3 = +127.0$ | $T_2 = 12.0$ | |
| | | | $R_4 = +2220.0$ | | $S_2 = 99.5$ |
| 3 | 1.5225 | 59.48 | $R_5 = +255.0$ | $T_3 = 14.0$ | |
| | | | $R_6 = -139.99$ | | $S_3 = 1.0$–$25.0$ |
| 4 | 1.5168 | 64.17 | $R_7 = -171.45$ | $T_4 = 3.0$ | |
| | | | $R_8 = +236.38$ | | |

The lens assembly of Table 3 has a focal length varying between 276.0 mm and 356.8 mm, and the length along the optic axis of the system varies between 134.5 mm and 158.5 mm. The equivalent focal length of lens 1 is $-612.52$ mm, of lens 2 is 260.15 mm, of lens 3 is 175.10 mm, and for lens 4, $-191.81$ mm. The nominal diameter of the lenses are respectively for lens 1, 105.0 mm; for lenses 2 and 3, 90.0 mm; and for lens 4, 110.0 mm.

In Table 3 the lens elements are numbered consecutively from the stage toward the screen as in Table 1 with the subscripts for the respective surfaces being also numbered consecutively in the same direction and given in millimeters with the thicknesses T given in millimeters for each individual lens, and the spacing S between the lenses being given in millimeters.

Table 4 shows the magnification of a lens according to Table 3 at various focal lengths for fixed stage-to-screen distances.

TABLE 4

| Lens Focal Length (mm) | Stage-to-Screen Distance (m) | | |
|---|---|---|---|
|  | 2.20 | 2.44 | 2.80 |
| 356.8 ($S_3$ = 1) | 3.88X | 4.59X | 5.65X |
| 311.2 ($S_3$ = 13) | 4.80X | 5.59X | 6.79X |
| 275.9 ($S_3$ = 25) | 5.69X | 6.57X | 7.91X |

This table shows a 1.4 to 1.5 change in magnification at any stage-to-screen distance. This is arrived at by taking the ratio of the absolute magnifications at the limiting focal length values of the lens system at any stage-to-screen distance.

Having disclosed the present invention with respect to several illustrative embodiments, it will be understood that proportional changes may be made in the lens assembly and not depart from the present invention as disclosed in the accompanying claims.

I claim:

1. A lens assembly for use in an overhead projector having a variable focal length to afford changes in magnification with fixed object-to-image distances as between the stage and the screen, said lens assembly comprising a first negative meniscus lens airspaced from a positive meniscus lens which is airspaced from a second positive double convex lens which is airspaced from a movable lens element which is a negative double concave lens affording a range of movement to change the focal length between about 276 mm to 356 mm and afford a change in the magnification by a factor of between 1.4× and 1.5×, and a mirror positioned between said positive lenses to fold the light path.

2. A lens assembly according to claim 1 wherein the characteristics of said lens elements and their spatial relationship are substantially the same as in the following table:

| | | | | |
|---|---|---|---|---|
| 1 | 1.6200 | 36.37 | $R_1 = -177.0$ | $T_1 = 3.0$ |
| | | | $R_2 = -319.49$ | |
| | | | | $S_1 = 1.0$ |
| | | | $R_3 = +135.23$ | |
| 2 | 1.5168 | 64.17 | | $T_2 = 13.0$ |
| | | | $R_4 = +2133.60$ | |
| | | | | $S_2 = 91.0$ |
| | | | $R_5 = +1200.0$ | |
| 3 | 1.5225 | 59.48 | | $T_3 = 12.0$ |
| | | | $R_6 = -127.0$ | |
| | | | | $S_3 = 1.0-40.0$ |
| | | | $R_7 = -184.20$ | |
| 4 | 1.5168 | 64.17 | | $T_4 = 3.0$ |
| | | | $R_8 = +616.60$ | | wherein the respective lens elements are numbered from the stage toward the screen in the first column, the corresponding refractive indices N for the D line of the spectrum are given in the second column, the corresponding dispersive indices V are given in the third column, the radii of curvature R of the lens surfaces are given in the fourth column, the respective surfaces being numbered in sequence in the same order as the lens elements and being respectively identified by the subscript numeral used with each R, plus and minus values of R indicating surfaces which are respectively convex and concave to radiation entering the lens from the stage; the axial thicknesses T of the respective lens elements and the air spaces S between lens elements are given in the 5th column, the respective thicknesses T of the lens elements and the air spaces S between lens elements being identified by subscripts numbered in sequence in the same order as the lens elements; and the quantities R, T, and S being expressed in millimeters for a lens system having a focal length varying between 277.3 mm and 356.4 mm.

3. A lens assembly according to claim 1 wherein the characteristics of said lens elements and their spatial relationship are substantially the same as in the following table:

| | | | | |
|---|---|---|---|---|
| 1 | 1.6200 | 36.37 | $R_1 = -155.45$ | $T_1 = 4.0$ |
| | | | $R_2 = -265.77$ | |
| | | | | $S_1 = 1.0$ |
| | | | $R_3 = +127.0$ | |
| 2 | 1.5168 | 64.17 | | $T_2 = 12.0$ |
| | | | $R_4 = +2220.0$ | |
| | | | | $S_2 = 99.5$ |
| | | | $R_5 = +255.0$ | |
| 3 | 1.5225 | 59.48 | | $T_3 = 14.0$ |
| | | | $R_6 = -139.99$ | |
| | | | | $S_3 = 1.0-25.0$ |
| | | | $R_7 = -171.45$ | |
| 4 | 1.5168 | 64.17 | | $T_4 = 3.0$ |
| | | | $R_8 = +236.38$ | | wherein the respective lens elements are numbered from the stage toward the screen in the first column, the corresponding refractive indices N for the D line of the spectrum are given in the second column, the corresponding dispersive indices V are given in the third column, the radii of curvature R of the lens surfaces are given in the fourth column, the respective surfaces being numbered in sequence in the same order as the lens elements and being respectively identified by the subscript numeral used with each R, plus and minus values of R indicating surfaces which are respectively convex and concave to radiation entering the lens from the stage; the axial thicknesses T of the respective lens elements and the air spaces S between lens elements are given in the 5th column, the respective thicknesses T of the lens elements and the air spaces S between lens elements being identified by subscripts numbered in sequence in the same order as the lens elements; and the quantities R, T, and S being expressed in millimeters for a lens system having a focal length varying between 276.0 mm and 356.8 mm.

4. A lens assembly according to claim 2 or claim 3 wherein a mirror is interposed between lens 2 and lens 3 to fold the light path.

* * * * *